(12) United States Patent
Karikallio (10) Patent No.: US 11,252,066 B2
(45) Date of Patent: Feb. 15, 2022

(54) AUTOMATED NETWORK MONITORING AND CONTROL

(71) Applicant: ELISA OYJ, Helsinki (FI)

(72) Inventor: Henri Karikallio, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 15/734,423

(22) PCT Filed: Jun. 26, 2019

(86) PCT No.: PCT/FI2019/050498
§ 371 (c)(1),
(2) Date: Dec. 2, 2020

(87) PCT Pub. No.: WO2020/002771
PCT Pub. Date: Jan. 2, 2020

(65) Prior Publication Data
US 2021/0176151 A1    Jun. 10, 2021

(30) Foreign Application Priority Data

Jun. 29, 2018  (FI) .................................... 20185597

(51) Int. Cl.
*H04L 12/26* (2006.01)
*H04L 12/24* (2006.01)

(52) U.S. Cl.
CPC ...... *H04L 43/0817* (2013.01); *H04L 41/0604* (2013.01)

(58) Field of Classification Search
None
See application file for complete search history.

(56) References Cited

U.S. PATENT DOCUMENTS

| | | |
|---|---|---|
| 6,446,123 B1 | 9/2002 | Ballantine et al. |
| 6,665,262 B1 | 12/2003 | Lindskog et al. |
| 7,120,633 B1 | 10/2006 | Kromer |
| 9,585,034 B1 | 2/2017 | Jadunandan et al. |
| 2002/0194319 A1 | 12/2002 | Ritche |
| 2004/0215765 A1* | 10/2004 | Asher ................. H04L 41/0273 709/224 |
| 2006/0233311 A1 | 10/2006 | Adams et al. |

(Continued)

FOREIGN PATENT DOCUMENTS

| | | |
|---|---|---|
| EP | 2262300 A1 | 12/2010 |
| EP | 3041283 A1 | 7/2016 |
| EP | 2871803 B1 | 12/2017 |

(Continued)

OTHER PUBLICATIONS

Finnish Patent and Registration Office, Decision-Application Accepted, Application No. 20185597, Dated Sep. 30, 2020, 1 page.

(Continued)

*Primary Examiner* — Joshua Joo
(74) *Attorney, Agent, or Firm* — Ziegler IP Law Group, LLC (57) ABSTRACT

A computer implemented method of network monitoring and control. The method includes identifying an alert related to a monitored device of a group of monitored devices; confirming that automatic actions are applicable for the monitored device; and performing at least one predefined automatic action for the monitored device, the action being selected based on the identified alert.

20 Claims, 7 Drawing Sheets

(56) References Cited

U.S. PATENT DOCUMENTS

| | | | |
|---|---|---|---|
| 2006/0233313 A1 | 10/2006 | Adams et al. | |
| 2010/0234006 A1 | 9/2010 | Vadlamudi | |
| 2011/0260879 A1 | 10/2011 | Avner et al. | |
| 2014/0195670 A1 | 7/2014 | Jain et al. | |
| 2016/0036898 A1* | 2/2016 | Curtis .................. | G09B 19/003 709/203 |
| 2016/0218911 A1 | 7/2016 | Wessels | |
| 2017/0126477 A1 | 5/2017 | Ponnuswamy | |
| 2017/0353991 A1 | 12/2017 | Tapia | |
| 2018/0091369 A1 | 3/2018 | Cunningham et al. | |
| 2018/0367370 A1* | 12/2018 | Tapia .................. | H04L 41/5067 |
| 2019/0340094 A1 | 11/2019 | Lu et al. | |
| 2019/0392328 A1 | 12/2019 | Bulacio et al. | |

FOREIGN PATENT DOCUMENTS

| | | |
|---|---|---|
| FI | 128647 B | 9/2020 |
| WO | 2012034684 A1 | 3/2012 |
| WO | 2015028714 A1 | 3/2015 |

OTHER PUBLICATIONS

Finnish Patent and Registration Office, Search Report, Application No. 20185597, dated Jan. 29, 2019, 2 pages.

Patent Cooperation Treaty, Notification of Transmittal of The International Search Report and The Written Opinion of The International Searching Authority, or The Declaration, Application No. PCT/FI2019/050498, dated Sep. 24, 2019, 13 pages.

Finnish Patent and Registration Office, Search Report, Application No. 20185596, dated Jan. 25, 2019, 2 pages.

Finnish Patent and Registration Office, Search Report, Application No. 20185598, dated Feb. 4, 2019, 2 pages.

Kazmi, Ahmad S, "Application of statistical sampling to predict faults from real time alarm data" Multitopic Conference (INMIC), 2011 IEEE 14th International, IEEE, XP032115235, DOI:10.1109/INMIC.2011.6151490ISBN:978-1-4577-0654-7, Dec. 22, 2011, 6 pages.

Patent Cooperation Treaty, International Search Report, Application No. PCT/FI209/050497, dated Sep. 6, 2019, 6 pages.

Patent Cooperation Treaty, Notification of Transmittal of The International Search Report and The Written Opinion of The International Searching Authority, or The Declaration, Application No. PCT/FI2019/050499, dated Aug. 28, 2019, 15 pages.

Patent Cooperation Treaty, Written Opinion of the International Searching Authority, Application No. PCT/FI2019/050497, dated Sep. 6, 2019, 7 pages.

United States Patent and Trademark Office, Final Office Action, U.S. Appl. No. 15/734,447, dated Nov. 23, 2021, 16 pages.

* cited by examiner

AUTOMATED NETWORK MONITORING AND CONTROL

TECHNICAL FIELD

The present application generally relates to automated network monitoring and control.

BACKGROUND

This section illustrates useful background information without admission of any technique described herein representative of the state of the art.

A network operation center (NOC) is generally a location from which NOC personnel exercises monitoring and control over a network. NOC personnel are responsible for monitoring one or many networks for certain conditions that may require special attention to avoid degraded service. NOC personnel follow screens showing events received from network devices, ongoing incidents and general network performance. NOC personnel decide upon required actions based on information they see on the screens.

Automation of NOC functionality of telecommunication networks has been developed in order to improve efficiency of network monitoring and control and to reduce the amount of manual work and human errors. But automation of network monitoring and control is not a straightforward task to implement.

SUMMARY

Various aspects of examples of the disclosed embodiments are set out in the claims. Any devices and/or methods in the description and/or drawings which are not covered by the claims are examples useful for understanding the disclosed embodiments.

According to a first example aspect of the present disclosure, there is provided a computer implemented method of network monitoring and control. The method comprises
a. identifying an alert related to a monitored device of a group of monitored devices;
b. confirming that automatic actions are applicable for the monitored device by checking that a ticket associated with the monitored device does not exist, and that automatic actions do not interfere with ongoing actions being performed in the monitored device; and
c. performing at least one predefined automatic action for the monitored device, the action being selected based on the identified alert.

In an embodiment, the method further comprises checking, after a predefined period of time, whether the identified alert has reappeared and responsively taking a further action.

In an embodiment, the identified alert indicates degraded performance in the group of monitored devices, faulty or degraded operation in the group of monitored devices and/or a change in external conditions.

In an embodiment, identifying the alert comprises obtaining performance data related to monitored devices, and identifying the alert based on the performance data and performance rules.

In an embodiment, the method further comprises identifying the alert based on one or more thresholds being exceeded in the performance data.

In an embodiment, the method further comprises identifying that a ticket associated with the monitored device exists and enriching the ticket based on the identified alert.

In an embodiment, the method further comprises identifying that the monitored device is in a quarantine list and responsively terminating processing of the identified alert.

In an embodiment, the method further comprises identifying that the monitored device is under maintenance or that a rollout is being performed in the monitored device and responsively terminating processing of the identified alert.

In an embodiment, the method further comprises identifying that a monitored device specific threshold or a system specific threshold has been exceeded and responsively terminating processing of the identified alert.

In an embodiment, the method further comprises identifying that the identified alert has reappeared and responsively generating a ticket for manual handling.

In an embodiment, the automatic action is an action affecting operation of the monitored device.

In an embodiment, the automatic action comprises one or more of the following: resetting the monitored device, changing value of at least one parameter in the network device, closing a port in the monitored device, opening a port in the monitored device, and automatically generating a ticket for manual action.

According to a second example aspect of the present disclosure, there is provided an apparatus comprising a processor and a memory including computer program code; the memory and the computer program code configured to, with the processor, cause the apparatus to perform the method of the first aspect or any related embodiment.

According to a third example aspect of the present disclosure, there is provided a computer program comprising computer executable program code which when executed by a processor causes an apparatus to perform the method of the first aspect or any related embodiment.

The computer program of the third aspect may be a computer program product stored on a non-transitory memory medium.

Different non-binding example aspects and embodiments of the present disclosure have been illustrated in the foregoing. The embodiments in the foregoing are used merely to explain selected aspects or steps that may be utilized in implementations of the present disclosure. Some embodiments may be presented only with reference to certain example aspects of the disclosure. It should be appreciated that corresponding embodiments may apply to other example aspects as well.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTON OF THE DRAWINGS

Example embodiments of the present disclosure and its potential advantages are understood by referring to FIGS. 1 through 5 of the drawings. In this document, like reference signs denote like parts or steps.

In an embodiment of the disclosure there is provided an automated network monitoring and control system. The developed automated solution can be employed in NOC functionality of a telecommunication network. Additionally or alternatively, the developed automated solution can be employed in monitoring and control of devices of a power grid or of devices of a cable or television network or some other group of monitored devices. In general, the developed automated solution can be employed for monitoring and control of any electronic devices that are communicatively connected to a network monitoring and control system implementing the automated solution. Various embodiments of the disclosure discussed in the following relate to monitoring of a telecommunication network, but it is to be understood that disclosed embodiments may be applied to other monitored devices, too. A monitored device in the sense of present disclosure can be any electronic device that is being monitored and/or controlled. It is to be noted that the group of monitored devices may be part of a larger system comprising also devices that are not being monitored. For example a telecommunication network may comprise a plurality of devices that are not being monitored or controlled through the present automated solution.

As operational load and network complexity increase due to increasing number of base stations and other network devices as well as increasing amount of manual work required for maintaining quality of network, there is increasing need for automation of network monitoring and control of telecommunication networks. At the same time the need for automated monitoring increases in other application areas, too.

Figure 1:
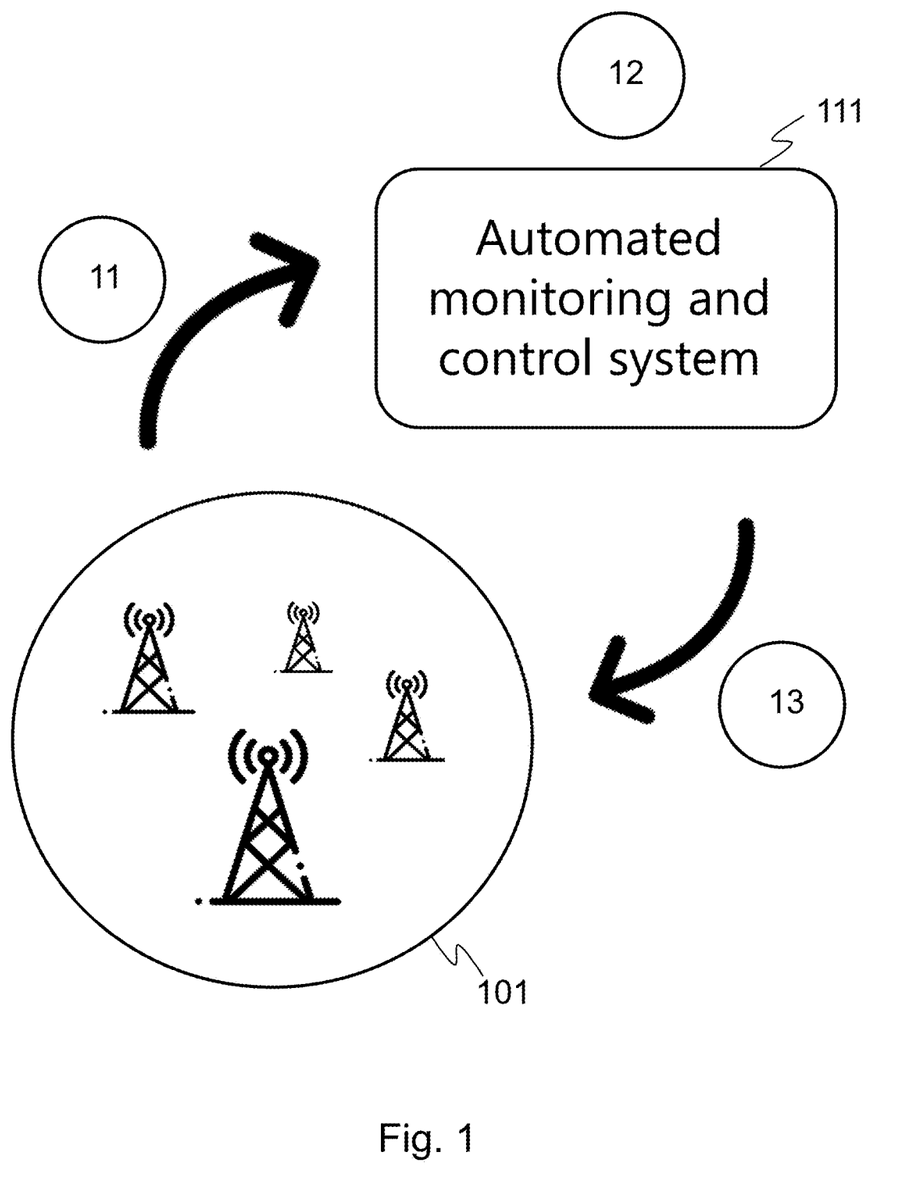
FIG. 1 shows an example scenario according to an embodiment.

FIG. 1 shows an example scenario according to an embodiment. The scenario shows a group of monitored devices 101 and an automated monitoring and control system 111. Alerts related to the monitored devices 101 are conveyed to the automated monitoring and control system 111 in phase 11. The cause for generation of an alert may be for example a fault in a monitored device such as one or more of the following: abnormal behaviour of a monitored device, hardware failure in a monitored device, exceeding a predefined threshold, synchronization problem, failure in operation of a functionality, excess load, insufficient storage capacity, insufficient processing resources, degraded performance etc. Performance of the monitored device or the whole system comprising the monitored device may be based on suitable performance indicators. The performance indicators may comprise for example counter values and/or Key Performance Indicator, KPI, values derived on the basis of one or more other performance indicators. In an example implementation, the performance indicators are observed over a predefined time and, if needed, an alert is generated on the basis of the observations. Additionally or alternatively, in a telecommunication network the cause for generation of an alert may be for example one or more of the following: abnormal behaviour of a base station, transmission problem in a network link, existence of an SNMP (Simple Network Management Protocol) trap, degraded throughput etc. Additionally or alternatively, the source of the alert may be an external system, such as a weather database or a traffic data source or a call data record (CDR) database.

The automated monitoring and control system 111 analyses the alerts in 12 to automatically decide on actions to be taken. The automatically decided actions are performed on one or more monitored devices in phase 13. It is to be noted that the action is decided and performed autonomously without human interaction. Furthermore, it is to be noted that the device originating the alert may be different from the device in which the automated action is applied. Additionally or alternatively, the automatically decided action may be generation of a ticket for manual action. In this case human actions may be used for solving the issue. The shown process is continuously repeated. Additionally, if the fault causing the alert(s) is not fixed by the automatic action and/or the alert reappears, a ticket for manual action may be generated.

Figure 2:
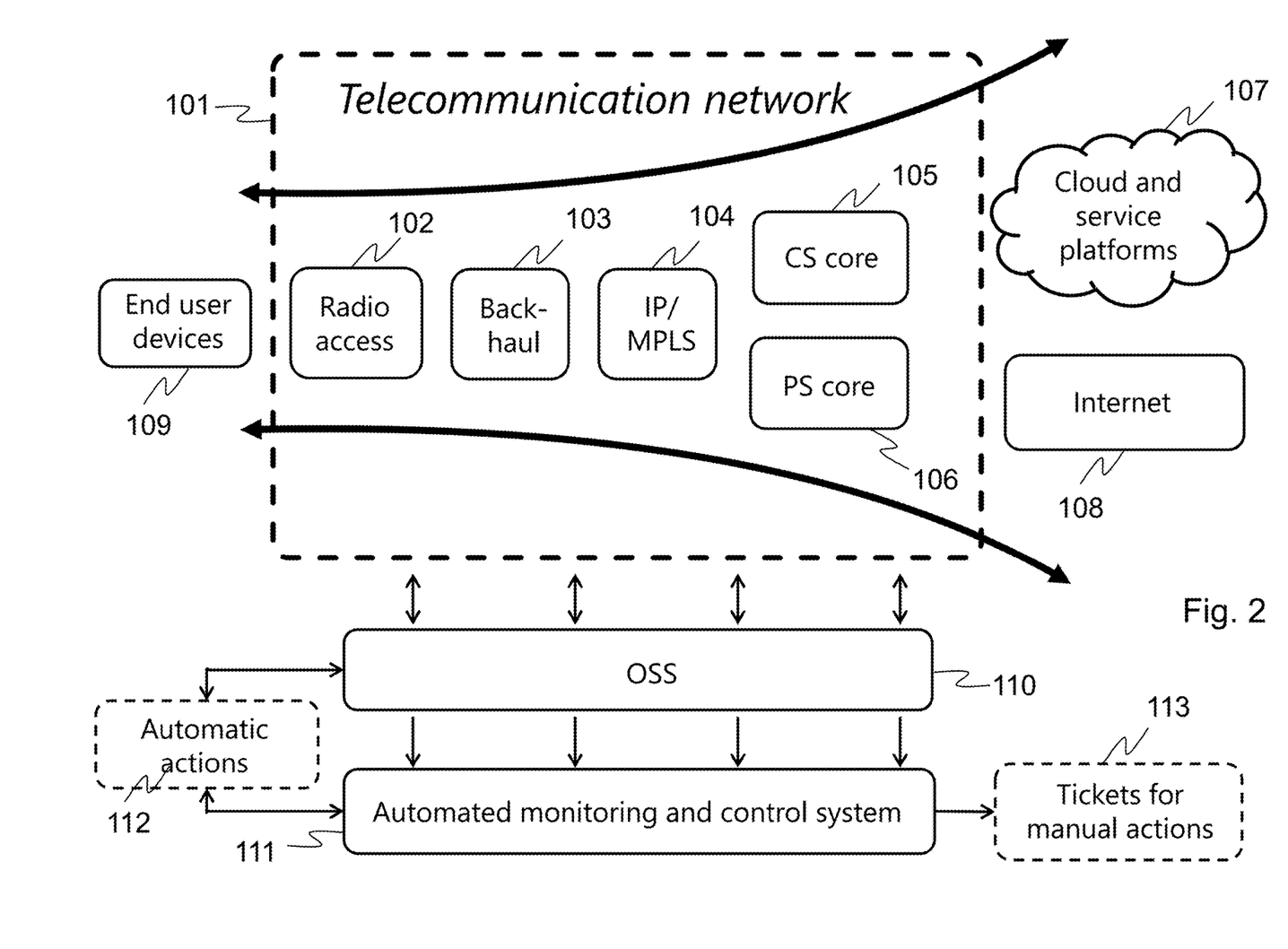
FIG. 2 shows a system according to an embodiment.

FIG. 2 shows a system according to an embodiment. The system comprises a telecommunication network 110, user devices 109, cloud and service platforms 107 and Internet 108. The telecommunication network 110 serves user devices 109 connected to the telecommunication network 110. The telecommunication network 110 provides communication services to the user devices such as for example access to cloud and service platforms 107 and Internet 108 and other systems. The telecommunication network 110 may be divided into a radio access network 102 comprising base stations that provide radio interface for connecting to the telecommunication network 110, a backhaul portion 103 that connects the radio interface of the radio access network 110 to other parts of the network, IP/MPLS (Internet Protocol/Multiprotocol Label Switching) portion 104 that provides data-carrying services for both circuit switched and packet switched communications, a circuit switched core network 105 for circuit switched communications and a packet switched core network 106 for packet switched communications.

Further the system of FIG. 2 comprises an OSS (Operations Support System) 110 and an automated monitoring and control system 111. The OSS continuously collects alerts from one or more monitored devices of the telecommunication network 110. For example hardware failure in a base station of the radio access network 102 causes generation of an alert that is then conveyed to the OSS. The alerts received in the OSS are conveyed to the automated monitoring and control system 111. The automated monitoring and control system 111 analyses the alerts to automatically decide on actions that may be required. The action may be an automatic action 112 performed on one or more monitored devices of the telecommunication network, such as resetting a monitored device, changing value of at least one parameter in a monitored device, closing a port in a monitored device, or opening a port in a monitored device. Alternatively or additionally the action may be generation of an alert ticket for manual action.

Figure 3:
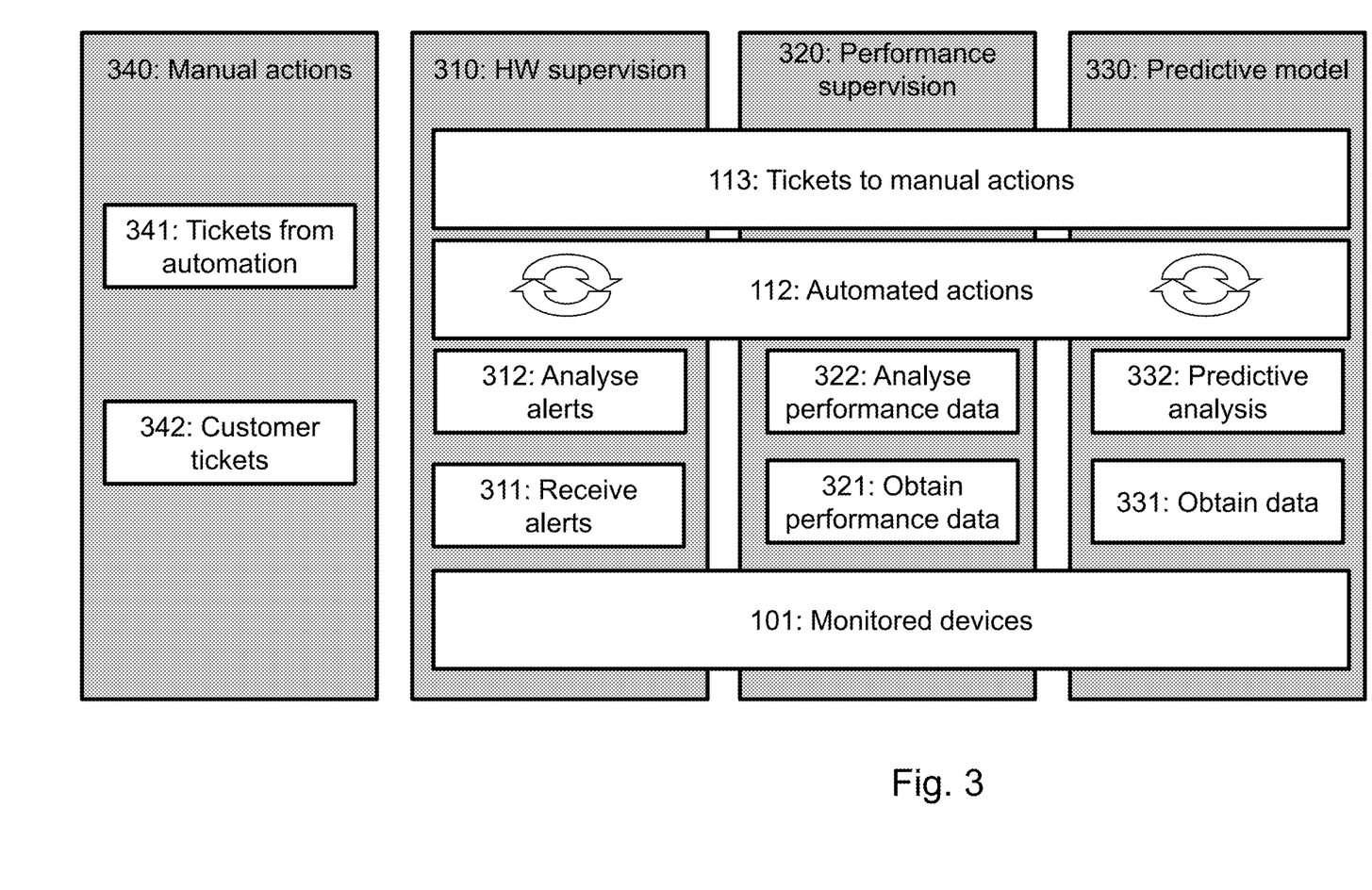
FIG. 3 shows logical components of an example system suited for implementing certain embodiments.

FIG. 3 shows logical components of an example system suited for implementing certain embodiments. The system is divided into a hardware supervision block 310, a performance supervision block 320, a predictive supervision block 330 and a manual actions block 340. The hardware supervision block 310 concerns collecting and analyzing 311, 312 alerts received from physical monitored devices, and automatically deciding and performing actions based on the analysis 112 and possibly generating tickets for manual actions 113. The performance supervision block 320 concerns collecting and analyzing performance data related to monitored devices 321, 322, and automatically deciding and performing actions based on the analysis 112 and possibly generating tickets for manual actions 113. The predictive supervision block 330 concerns collecting 331 data from the monitored devices, the data comprising for example alerts and/or performance data, and predicting forthcoming alerts or incidents based on collected data 332. The predicted alerts or incidents are then used for deciding and performing actions 112 and possibly for generating tickets for manual actions 113. The manual actions block 340 concerns manually performed work, such as 342: handling of tickets relating to customer complaints and 341: handling of tickets generated by the automatic process of one of the blocks 310-330. It is to be noted that data for the hardware supervision, performance supervision and predictive supervision blocks 310, 320, 330 may be collected from other external sources, too. Certain embodiments of present disclosure relate mainly but not exclusively to the hardware supervision block 310 and the performance supervision block 320.

FIGS. 4A-4E show flow diagrams illustrating example methods according to certain embodiments. The methods may be implemented in the automated monitoring and control system 111 of FIGS. 1 and 2. The methods are implemented in a computer and do not require human interaction. It is to be noted that the methods may however provide output that may be further processed by humans. The methods of FIGS. 4A-4E may be combined with each other and the order of phases conducted in each method may be changed expect where otherwise explicitly defined. Furthermore it is to be noted that performing all phases of the flow charts is not mandatory.

Figure 4A:
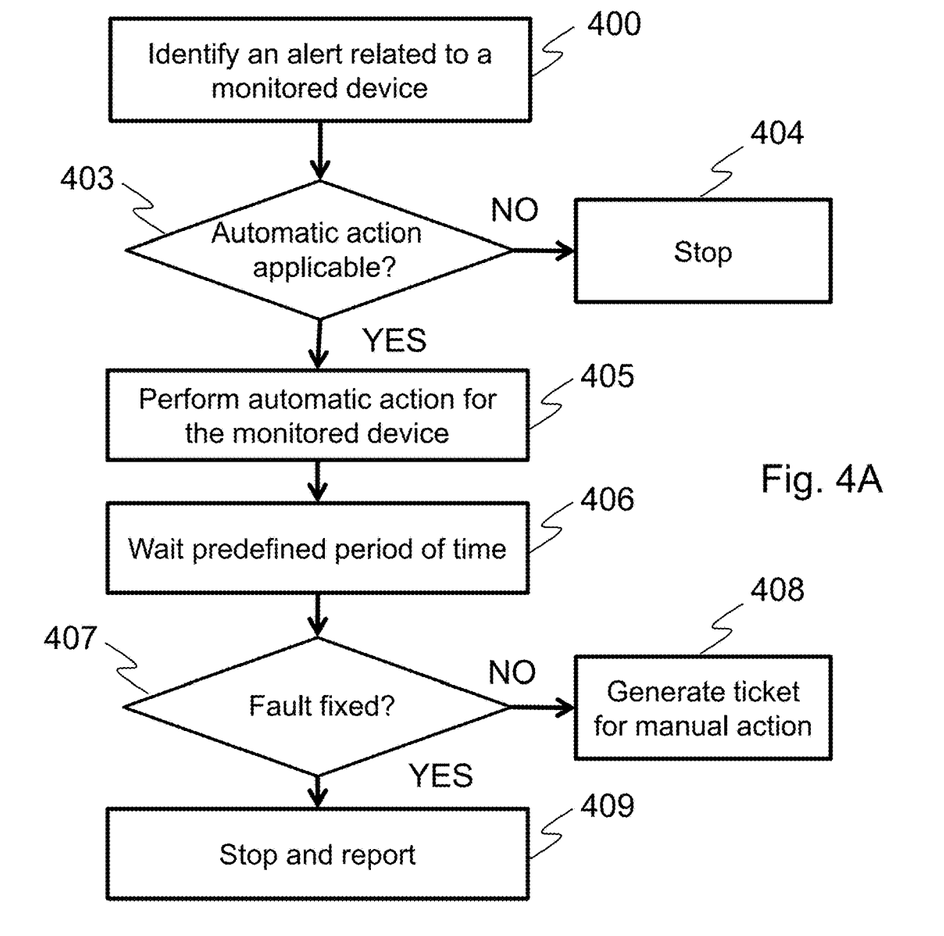
FIGS. 4A-4E show flow diagrams illustrating example methods according to certain embodiments.

FIG. 4A shows a flow diagram illustrating a method according to an embodiment of the present disclosure. The method comprises following phases:

Phase 400: An alert related to a monitored device is identified. The alerts may be alerts concerning faults in operation of monitored devices. The faults may concern hardware problems, unavailable services or degraded performance as discussed in connection with FIG. 1. Additionally or alternatively the source of alerts may be an external source, such as weather database or traffic surveillance database. In an embodiment, phase 400 comprises filtering the alerts that are being processed to reduce the number of alerts in further processing and/or classifying the alerts to different categories.

Phase 403: It is checked whether an automatic action can be applied to the monitored device. In general this refers to checking whether performing an automatic action would interfere with some other ongoing action or whether there is some other matter that indicates the automatic action should be avoided. More detailed embodiments relating to performing this phase are discussed in connection with FIGS. 4C-4E. In an embodiment the checking of applicability of the automatic actions if performed by checking that a ticket associated with the monitored device does not exist, and that automatic actions do not interfere with ongoing actions being performed in the monitored device. Additionally it may be checked that the monitored device is not in a quarantine list. If it is concluded that automatic actions are not applicable, processing of the identified alert is terminated in phase 404. A report of the identified alert may be generated, though. Additionally or alternatively, a ticket for manual operations may be generated so that human intervention is possible if needed. If it is concluded that automatic actions are applicable, the process proceeds to phase 405. By checking applicability of automatic actions, one achieves that risk of automatically performing unnecessary or even harmful actions can be reduced. This is beneficial in connection with any alert, but especially alerts concerning degraded performance might cause unnecessary actions to be taken if such checking phase was not performed.

Phase 405: An action is performed for the monitored device based on the identified alert. The action may be chosen for example based on predefined rules or predefined logic charts. It is to be noted that more than one alert related to the monitored device may have been identified and the action may be chosen on the basis of more than one identified alert. That is, there may be a certain alert pattern that leads to a certain action, while one single alert may lead to another action. It is to be noted that in this context an action may comprise a single action or more than one actions.

Phase 406: The process waits for a predefined period of time. This may be for example 5 min, 10 min, 20 min, 30 min or an hour.

Phase 407: It is checked whether the fault causing the alert identified in phase 402 was fixed. In an example embodiment this is implemented by checking if the identified alert reappears. If the fault was fixed, the process stops in phase 409 and a report is generated to log the action that was taken by the automatic process. If the fault was not fixed, a ticket for manual action is generated in phase 408. Alternatively or additionally, the process may return to phase 405 to repeat the action for the monitored device. Yet another alternative (not shown in FIG. 4A) is to perform for the monitored device another action different from the action performed in phase 405.

By checking whether the alert reappears and generating a ticket for manual action if necessary, one achieves that the automatic system does not continue to perform the automatic action forever, if the action is not fixing the problem.

In an embodiment the alert that is identified in phase 400 is a cell faulty alert in a telecommunication network and the action that is performed in phase 405 is resetting the monitored device (the monitored device may be for example a base station). For example existence of one or more of the following alerts may be considered a cell faulty alert: monitored device disconnected, base station down, cell out of service, cell unavailable, and transmission interruption.

Other embodiments comprise the following different embodiments:

The alert that is identified in phase 400 is an indication of no data transmission in a cell and the action that is performed in phase 405 is reactivating data transmission in the cell by resetting the monitored device.

The alert that is identified in phase 400 is an indication of no data transmission in a cell and the action that is performed in phase 405 is reactivating data transmission in the cell by deactivating and activating a GPRS (General Packet Radio Service) parameter.

The alert that is identified in phase 402 is an indication of a fault in VSWR (Voltage Standing Wave Ratio) antenna monitoring or a VSWR alarm and the action that is performed in phase 405 is generation of a ticket for manual action.

The alert that is identified in phase 402 is an indication of a power unit output voltage fault and the action that is performed in phase 405 is generation of a ticket for manual action.

The alert that is identified in phase 402 is an indication of a fault in the chain between a power unit and MHA (MastHead Amplifier) and the action that is performed in phase 405 is generation of a ticket for manual action.

The alert that is identified in phase 402 is an indication of a LAN (Local Area Network) error or a communication error and the action that is performed in phase 405 is resetting the network device.

The alert that is identified in phase 402 is an indication of a control plane problem and the action that is performed in phase 405 is deactivating and activating LTE (Long Term Evolution) S1 link.

The alert that is identified in phase 400 is an indication of exceeded threshold in Twamp (Two-Way Active Measurement Protocol) measurement and the action that is performed in phase 405 is resetting the network device.

The alert that is identified in phase 400 is an indication of over 20 Bad Uplink events in a day or an indication of over 20 abnormal distribution events and the action that is performed in phase 405 is locking and opening a cell. It is to be noted that instead of 20, the threshold may be some other number such as for example 10, 30 or 50.

Figure 4B:
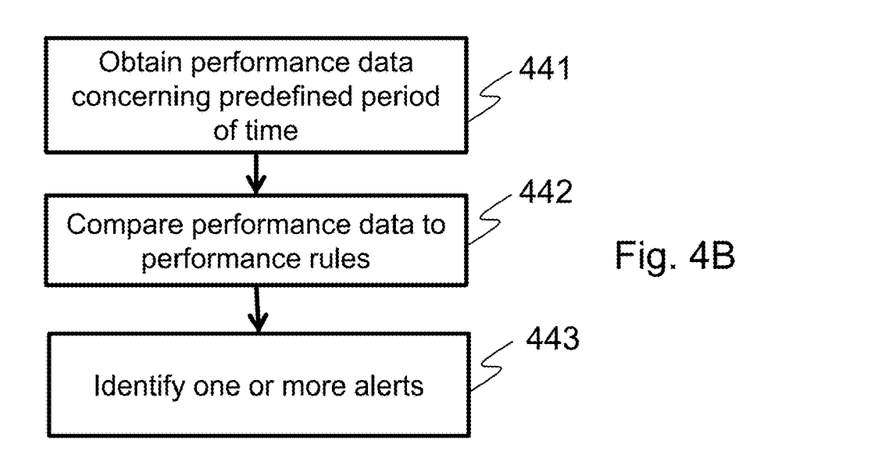

FIG. 4B shows a flow diagram illustrating a method according to an embodiment of the present disclosure. The method is one example implementation of phase 400 of FIG. 4A. The method comprises following phases:

Phase 441: Performance data concerning a predefined period of time is obtained. The predefined time may be for example 10 min, 15 min, 30 min, 1 h, 3 h, 5 h or a day. The performance data may comprise counter values, transmission or throughput rates or other performance indicators. As an example, a counter may count for example number of dropped connections. Additionally or alternatively the performance data may comprise a performance value derived on the basis of more than one counter values.

Phase 442: The performance data is compared to performance rules or decision logic. Phase 443: One or more alerts are identified on the basis of the comparison phase 443.

Figure 4C:
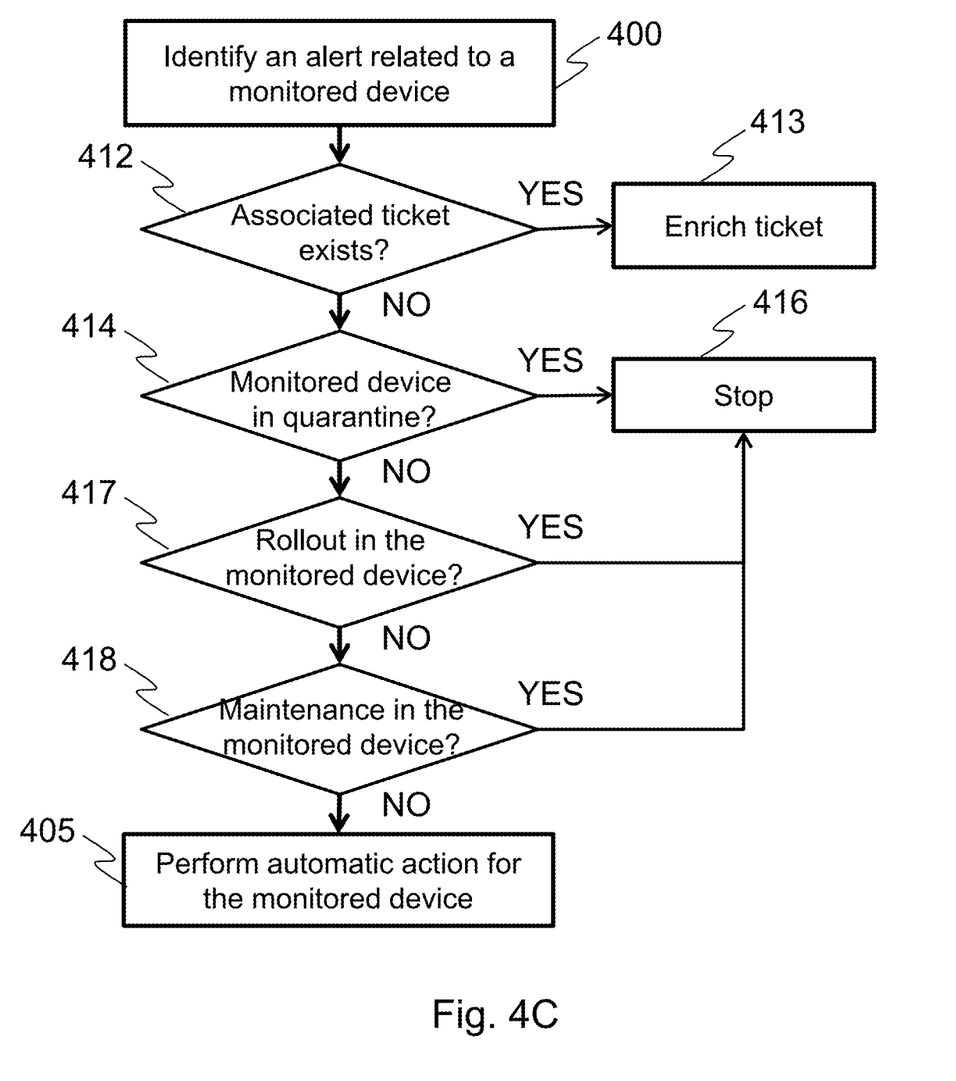

FIG. 4C shows a flow diagram illustrating a method according to an embodiment of the present disclosure. The method comprises following phases:

Phase 400: An alert related to a monitored device is identified similarly to FIG. 4A.

In phases 412, 414, 417 and 418 it is checked whether an automatic action can be applied to the monitored device.

Phase 412: It is checked whether a ticket associated with the monitored device already exists. That is, it is checked if a problem associated with the monitored device has already been identified. If it is found out that a ticket already exists, the ticket is enriched with information about the identified alert in phase 413. Otherwise the process proceeds to phase 414.

Phase 414: It is checked whether the monitored device is in a quarantine list. If it is found out that the monitored device is in a quarantine list, processing of the identified alert is terminated in phase 416. A report of the identified alert may be generated. Otherwise the process proceeds to phase 417. In an embodiment, a monitored device is inserted into a quarantine list whenever certain automatic action (e.g. reset) is being performed in the monitored device and the monitored device is kept on the list for a period of time that may be for example 1, 3 or 5 days or 1, 2, 4 or 7 weeks. During this time further automatic actions are prevented in the monitored device. In this way the checking phase 414 provides that the automatic action is not continuously repeated for the monitored device. The quarantine list may indicate which alert caused the quarantine and this may be taken into account when checking whether the monitored device is in the quarantine list.

Phase 417: It is checked whether a rollout process is being performed in the monitored device. If it is found out that there is a rollout in progress, processing of the identified alert is terminated in phase 416. A report of the identified alert may be generated. Otherwise the process proceeds to phase 418.

Phase 418: It is checked whether the monitored device is in maintenance. If it is found out that there is a maintenance work in progress, processing of the identified alert is terminated in phase 416. A report of the identified alert may be generated. Otherwise the process proceeds to phase 405.

Phases 417 and 418 provide that automatic actions do not interfere with any ongoing actions being performed in the monitored device. Also phase 414 provides that automatic actions do not interfere with any ongoing actions being performed in the monitored device.

Phase 405: An action is performed for the monitored device based on the identified alert. The action may be chosen for example based on predefined rules or predefined logic charts. It is to be noted that more than one alert related to the monitored device may have been identified and the action may be chosen on the basis of more than one identified alert. That is, there may be a certain alert pattern that leads to a certain action, while one single alert may lead to another action. It is to be noted that in this context an action may comprise a single action or more than one actions. By checking whether a ticket associated with the monitored device already exists and that automatic actions do not interfere with any ongoing actions being performed in the monitored device and performing any automated actions only after passing these checks, one achieves a comprehensive check on whether there is an indication of that the automated correction might not be desirable. In this way, one achieves reducing the probability of performing unnecessary automated actions.

In an embodiment, the process proceeds from phase 405 to phases 406-409 as disclosed in FIG. 4A.

Figure 4D:
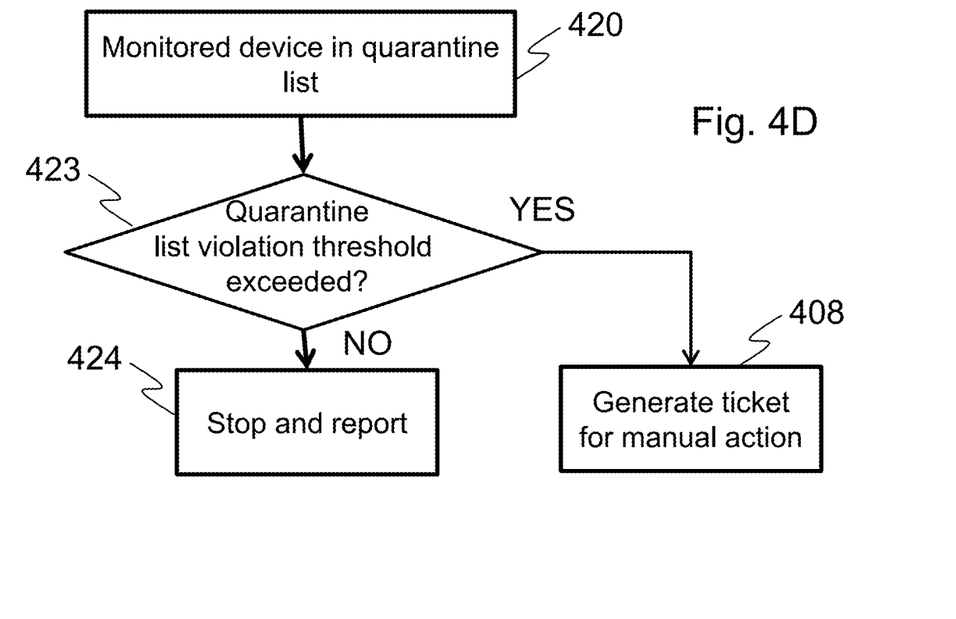

FIG. 4D shows a flow diagram illustrating a method according to an embodiment of the present disclosure. The method comprises following phases:

Phase 420: It is detected that a monitored device is in a quarantine list for example as a result of the checking in phase 414 of FIG. 4C.

Phase 423: It is checked how many times the quarantine list has been violated and whether a threshold is being exceeded. Violation of the quarantine list refers to that the process tries to perform an automatic action for a monitored device that is listed on the quarantine list. The number of such violations is logged. The threshold may be for example 5, 10, 20 or 30 violations per monitored device. The threshold may be alert specific. That is, a different counter may be maintained for different alerts. Counter of the violations is reset when the network device is removed from the quarantine list.

If the threshold has been exceeded, a ticket for manual action is generated in phase 408. In this way human interaction is provided for solving the reason for repeated requests for automatic actions. If the threshold has not been exceeded, processing of the alert identified for the monitored device is terminated in phase 424 and the quarantine list violation counter is incremented.

Figure 4E:
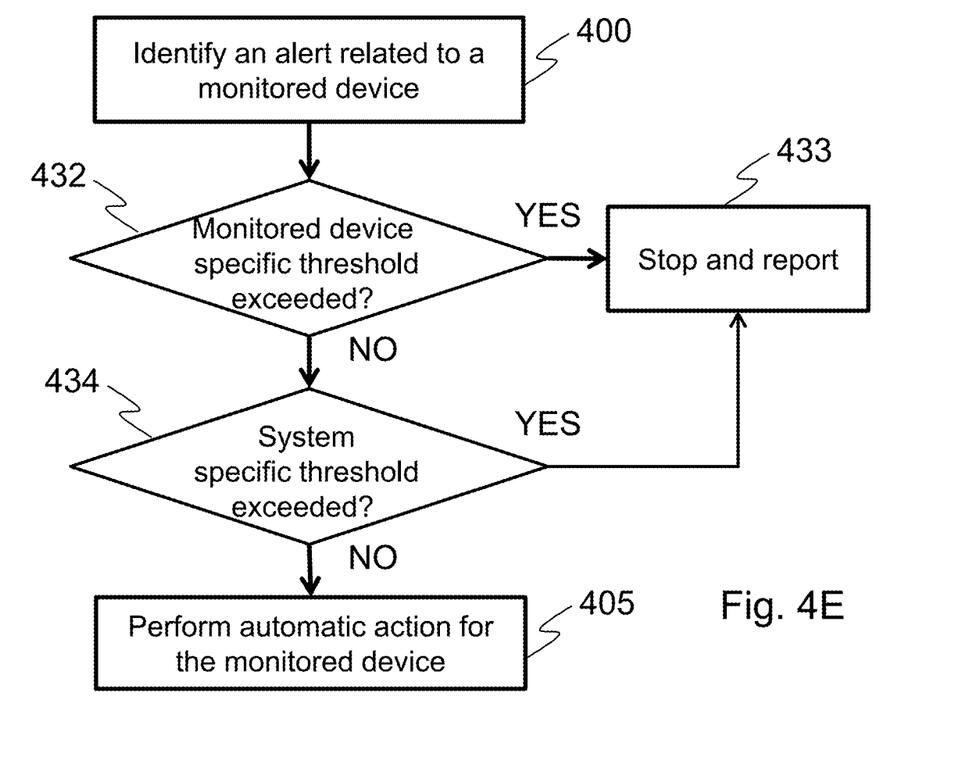

FIG. 4E shows a flow diagram illustrating a method according to an embodiment of the present disclosure. The method comprises following phases:

Phase 400: An alert related to a monitored device is identified similarly to FIG. 4A.

In phases 432 and 434 it is checked whether an automatic action can be applied to the monitored device.

Phase 432: It is checked whether a monitored device specific threshold has been exceeded. If it is found out that the threshold has been exceeded, processing of the identified alert is terminated in phase 433. A report of the identified alert may be generated. Otherwise the process proceeds to phase 434. The threshold may be for example at least 5% or 10% degradation in performance compared to previous performance values. The checking phase 434 provides that the automatic actions can be controlled on a monitored device level and for example performing ineffective actions can be reduced. Performance may be degraded from optimal, but if there has not been a significant change compared to previous values, corrective actions may not be required or may not be effective.

Phase 434: It is checked whether a network specific or a system specific threshold has been exceeded. If it is found out that the threshold has been exceeded, processing of the identified alert is terminated in phase 433. A report of the identified alert may be generated. Otherwise the process proceeds to phase 405. The threshold may be for example maximum 50, 100 or 150 actions per day. The checking phase 434 provides that the automatic actions can be controlled on a network or system level and for example resetting all monitored devices of a system at the same time can be prevented.

Phase 405: An action is performed for the monitored device based on the identified alert. The action may be chosen for example based on predefined rules or predefined logic charts. It is to be noted that more than one alert related to the network device may have been identified and the action may be chosen on the basis of more than one identified alert. That is, there may be a certain alert pattern that leads to a certain action, while one single alert may lead to another action. It is to be noted that in this context an action may comprise a single action or more than one actions. Network device specific or network specific counter may be increment after the automatic action has been performed.

In an embodiment, the process proceeds from phase 405 to phases 406-409 as disclosed in FIG. 4A.

Figure 5:
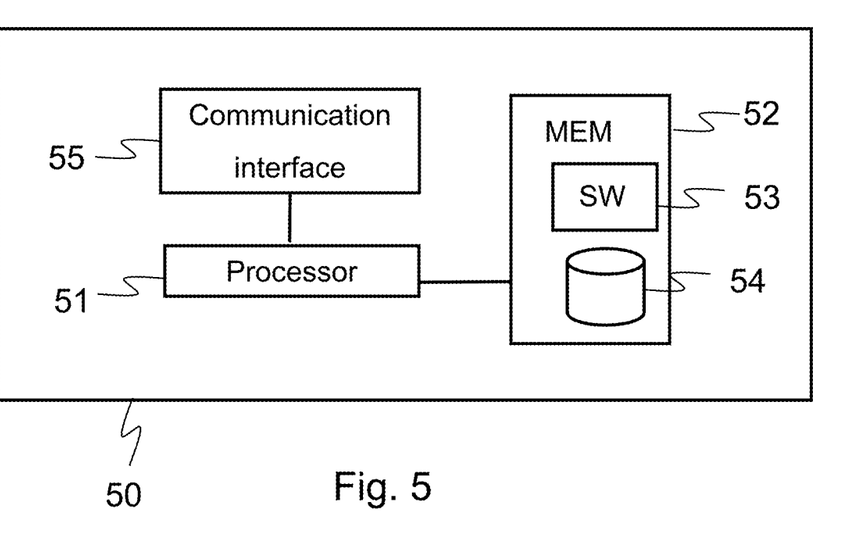
FIG. 5 shows an apparatus according to an embodiment.

FIG. 5 shows an apparatus 50 according to an embodiment. The apparatus 50 is for example a general-purpose computer or server or some other electronic data processing apparatus. The apparatus 50 can be used for implementing embodiments of the present disclosure. That is, with suitable configuration the apparatus 50 is suited for operating for example as the network monitoring and control system 111 of foregoing disclosure.

The general structure of the apparatus 50 comprises a processor 51, and a memory 52 coupled to the processor 51. The apparatus 50 further comprises software 53 and database 54 stored in the memory 52 and operable to be loaded into and executed in the processor 51. The software 53 may comprise one or more software modules and can be in the form of a computer program product. The database 54 may be usable for storing e.g. rules and patterns for use in data analysis. Further, the apparatus 50 comprises a communication interface 55 coupled to the processor 51.

The processor 51 may comprise, e.g., a central processing unit (CPU), a microprocessor, a digital signal processor (DSP), a graphics processing unit, or the like. FIG. 5 shows one processor 51, but the apparatus 50 may comprise a plurality of processors.

The memory 52 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 50 may comprise a plurality of memories. The memory 52 may be constructed as a part of the apparatus 50 or it may be inserted into a slot, port, or the like of the apparatus 50 by a user.

The communication interface 55 may comprise communication modules that implement data transmission to and from the apparatus 50. The communication modules may comprise, e.g., a wireless or a wired interface module. The wireless interface may comprise such as a WLAN, Bluetooth, infrared (IR), radio frequency identification (RFID), GSM/GPRS, CDMA, WCDMA, or LTE (Long Term Evolution) radio module. The wired interface may comprise such as Ethernet or universal serial bus (USB), for example. Further the apparatus 50 may comprise a user interface (not shown) for providing interaction with a user of the apparatus. The user interface may comprise a display and a keyboard, for example. The user interaction may be implemented through the communication interface 55, too.

The database 54 may be certain memory area in the memory 52 or alternatively the database 54 may be a separate component or the database 54 may be located in a physically separate database server that is accessed for example through the communication unit 55. The database unit 54 may be a relational (SQL) or a non-relational (NoSQL) database.

A skilled person appreciates that in addition to the elements shown in FIG. 5, the apparatus 50 may comprise other elements, such as microphones, displays, as well as additional circuitry such as memory chips, application-specific integrated circuits (ASIC), other processing circuitry for specific purposes and the like. Further, it is noted that only one apparatus is shown in FIG. 5, but the embodiments of the present disclosure may equally be implemented in a cluster of shown apparatuses.

Without in any way limiting the scope, interpretation, or application of the claims appearing below, a technical effect of one or more of the example embodiments disclosed herein is ability to automate network monitoring and control in telecommunication networks.

Another technical effect of one or more of the example embodiments disclosed herein is that increasing number of issues in monitored devices can be solved before they are visible to end users thereby improving user experience. Another technical effect of one or more of the example embodiments disclosed herein is that complex systems with increasing traffic amount can be handled without necessarily needing additional personnel for network monitoring tasks.

Another technical effect of one or more of the example embodiments disclosed herein is that risk of human errors may be reduced. For example in a NOC functionality it is likely that due to huge amount of alerts to be monitored, some alerts may go unnoticed by the monitoring personnel. Whereas, in the automated solution, all alerts are equally processed.

If desired, the different functions discussed herein may be performed in a different order and/or concurrently with each other. Furthermore, if desired, one or more of the before-described functions may be optional or may be combined.

Although various aspects of the disclosed embodiments are set out in the independent claims, other aspects of the disclosed embodiments comprise other combinations of features from the described embodiments and/or the dependent claims with the features of the independent claims, and not solely the combinations explicitly set out in the claims.

It is also noted herein that while the foregoing describes example embodiments of the present disclosure, these descriptions should not be viewed in a limiting sense. Rather, there are several variations and modifications, which may be made without departing from the scope of the present disclosure as defined in the appended claims.

The invention claimed is:

1. A computer implemented method of network monitoring and control, the method comprising identifying an alert related to a monitored device of a group of monitored devices;

confirming that automatic actions are applicable for the monitored device, by checking that a ticket associated with the monitored device does not exist, and that the monitored device is not on a quarantine list, and that automatic actions do not interfere with ongoing actions being performed in the monitored device;

wherein the quarantine list is such that a monitored device is inserted into the quarantine list whenever an automatic action is being performed for the monitored device and the monitored device is kept on the quarantine list for a period of time; and performing at least one predefined automatic action for the monitored device, the action being selected based on the identified alert.

2. The method of claim 1, further comprising
checking, after a predefined period of time, whether the identified alert has reappeared and responsively taking a further action.

3. The method of claim 1, wherein the identified alert indicates degraded performance or faulty or degraded operation in the group of monitored devices.

4. The method of claim 1, wherein the identified alert indicates a change in external conditions.

5. The method of claim 1, wherein identifying the alert comprises
obtaining performance data related to monitored devices, and
identifying the alert based on the performance data and performance rules.

6. The method of claim 5, further comprising
identifying the alert based on one or more thresholds being exceeded in the performance data.

7. The method of claim 1, further comprising
identifying that a ticket associated with the monitored device exists and enriching the ticket based on the identified alert.

8. The method of claim 1, further comprising
identifying that the monitored device is in a quarantine list and responsively terminating processing of the identified alert.

9. The method of claim 1, further comprising
identifying that the monitored device is under maintenance or that a rollout is being performed in the monitored device and responsively terminating processing of the identified alert.

10. The method of claim 1, further comprising
identifying that a monitored device specific threshold or a system specific threshold has been exceeded and responsively terminating processing of the identified alert.

11. The method of claim 2, further comprising
identifying that the identified alert has reappeared and responsively generating a ticket for manual handling.

12. The method of claim 1, wherein the automatic action is an action affecting operation of the monitored device.

13. The method of claim 1, wherein the automatic action comprises one or more of the following: resetting the monitored device, changing value of at least one parameter in the network device, closing a port in the monitored device, opening a port in the monitored device, and automatically generating a ticket for manual action.

14. An apparatus comprising
a processor, and
a memory including computer program code; the memory and the computer program code configured to, with the processor, cause the apparatus;
to identify an alert related to a monitored device of a group of monitored devices;
to confirm that automatic actions are applicable for the monitored device, by checking that a ticket associated with the monitored device does not exist, and that the monitored device is not on a quarantine list, and that automatic actions do not interfere with ongoing actions being performed in the monitored device;
wherein the quarantine list is such that a monitored device is inserted into the quarantine list whenever an automatic action is being performed for the monitored device and the monitored device is kept on the quarantine list for a period of time; and
to perform at least one predefined automatic action for the monitored device, the action being selected based on the identified alert.

15. The apparatus of claim 14, wherein the identified alert indicates degraded performance or faulty or degraded operation in the group of monitored devices.

16. The apparatus of claim 14, wherein the identified alert indicates a change in external conditions.

17. The apparatus of claim 14, wherein the memory and the computer program code are further configured to, with the processor, cause the apparatus to identify that the monitored device is in a quarantine list and responsively terminate processing of the identified alert.

18. The apparatus of claim 14, wherein the memory and the computer program code are further configured to, with the processor, cause the apparatus to identify that the monitored device is under maintenance or that a rollout is being performed in the monitored device and responsively terminate processing of the identified alert.

19. The apparatus of claim 14, wherein the automatic action comprises one or more of the following: resetting the monitored device, changing value of at least one parameter in the network device, closing a port in the monitored device, opening a port in the monitored device, and automatically generating a ticket for manual action.

20. A computer program comprising computer executable program code stored on a non-transitory memory medium, which when executed by a processor causes an apparatus to perform;
identifying an alert related to a monitored device of a group of monitored devices;
confirming that automatic actions are applicable for the monitored device, by checking that a ticket associated with the monitored device does not exist, and that the monitored device is not on a quarantine list, and that automatic actions do not interfere with ongoing actions being performed in the monitored device;
wherein the quarantine list is such that a monitored device is inserted into the quarantine list whenever an automatic action is being performed for the monitored device and the monitored device is kept on the quarantine list for a period of time; and
performing at least one predefined automatic action for the monitored device, the action being selected based on the identified alert.

* * * * *